United States Patent
Hori et al.

[11] Patent Number: 5,255,112
[45] Date of Patent: Oct. 19, 1993

[54] OPTICAL SCANNING APPARATUS AND SYSTEM

[75] Inventors: Yasuro Hori, Katsuta; Seiji Maruo; Yasuaki Suzuki, both of Hitachi, all of Japan

[73] Assignee: Hitachi, Ltd., Tokyo, Japan

[21] Appl. No.: 810,339

[22] Filed: Dec. 19, 1991

[30] Foreign Application Priority Data

Dec. 20, 1990 [JP] Japan ................... 2-404146
Nov. 29, 1991 [JP] Japan ................... 3-316003

[51] Int. Cl.$^5$ .......................... G02B 26/08
[52] U.S. Cl. ...................... 359/196; 359/216; 250/235; 346/108
[58] Field of Search .......... 359/282, 851, 727, 208, 359/212, 196, 197, 216, 217, 218, 219; 250/235, 236; 356/300; 385/146; 346/108, 160

[56] References Cited

U.S. PATENT DOCUMENTS

| | | | |
|---|---|---|---|
| 4,239,337 | 12/1980 | Campbell et al. | 359/282 |
| 4,778,991 | 10/1988 | Nozaki et al. | 250/235 |
| 4,867,547 | 9/1989 | Vogl | 359/727 |
| 4,931,637 | 6/1990 | Succari et al. | 250/235 |
| 4,966,446 | 10/1990 | Huang et al. | 359/851 |

Primary Examiner—Loha Ben
Attorney, Agent, or Firm—Antonelli, Terry, Stout & Kraus

[57] ABSTRACT

A small and inexpensive optical scanning apparatus is attained by an optical block 1 disposed between a rotating mirror 2 and a photosensitive body 3 and having specular surfaces formed at part of inner side of surface so that light from the rotating mirror 2 is reflected within the optical block 1 plural times back and forth and reaches the photosensitive body 3 in order to correct the curvature of field, the distortion aberration and the inclination of surface in an optical scanning system. The length of the optical path within the optical block including reflection is set to 60% or more of the whole length of optical path from the rotating mirror 2 to the photosensitive body 3. The surface of the optical block 1 on the side of the photosensitive body is formed into a curved surface to constitute a concave mirror. The rotating mirror and the photosensitive body are arranged in optically conjugate relation in sub-scanning direction by the focal distance.

34 Claims, 10 Drawing Sheets

F I G. 5
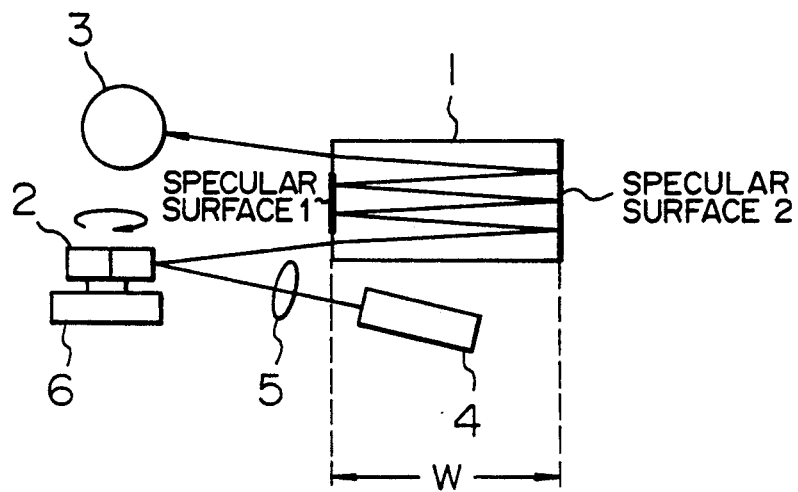
F I G. 6
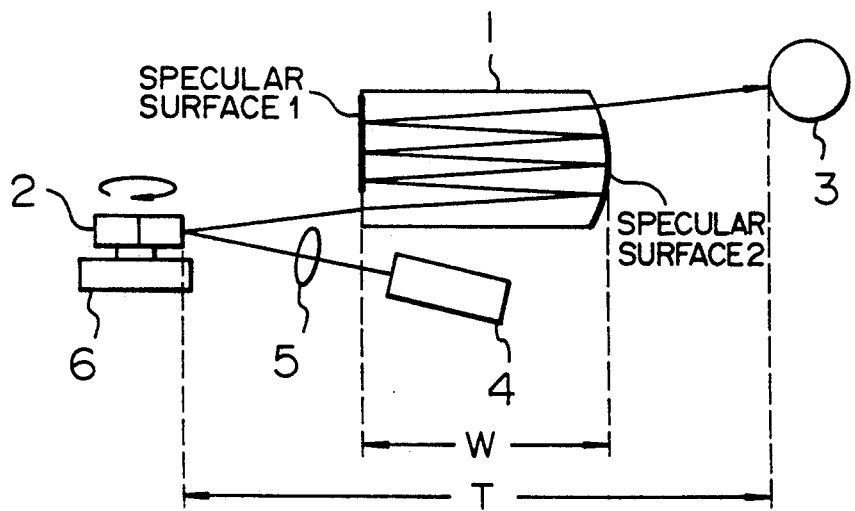

F I G. 15
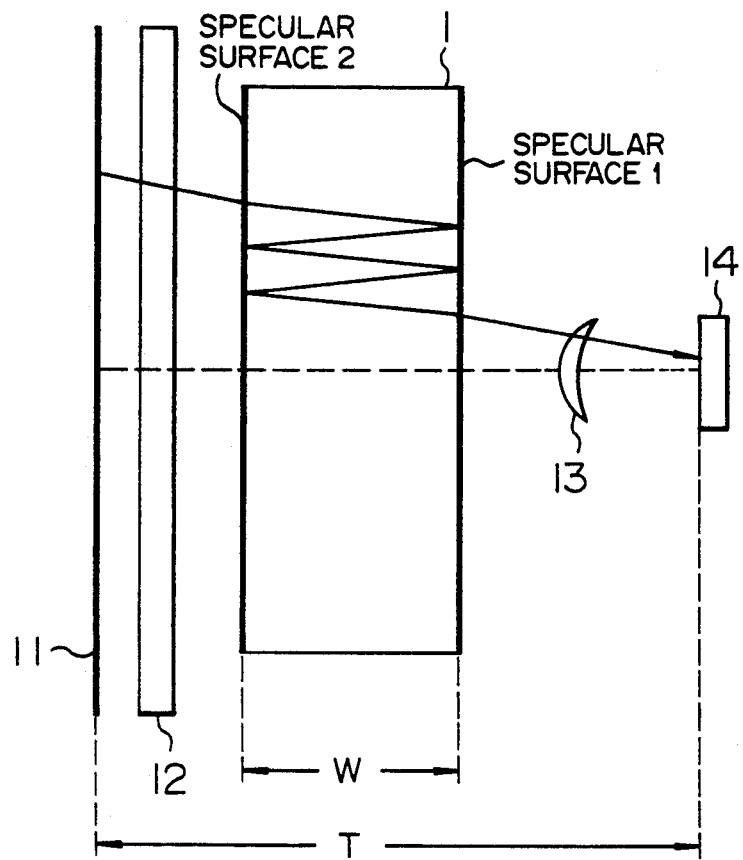
F I G. 16
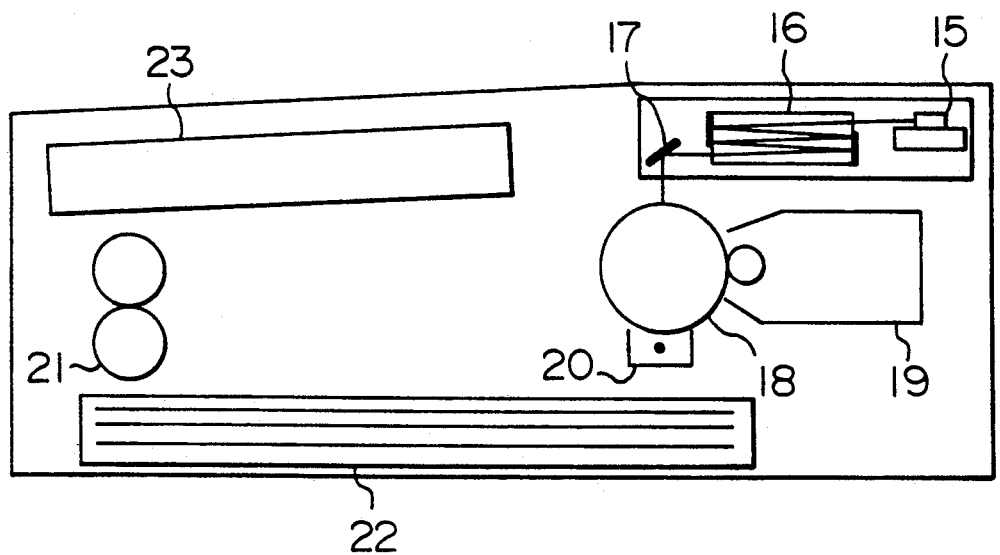

F I G. 17
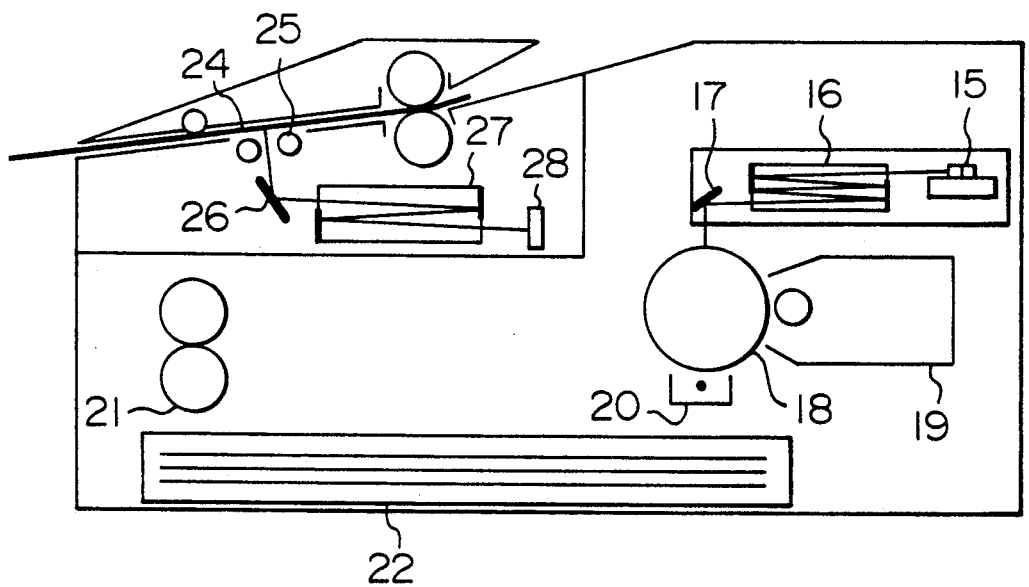

F I G. 18
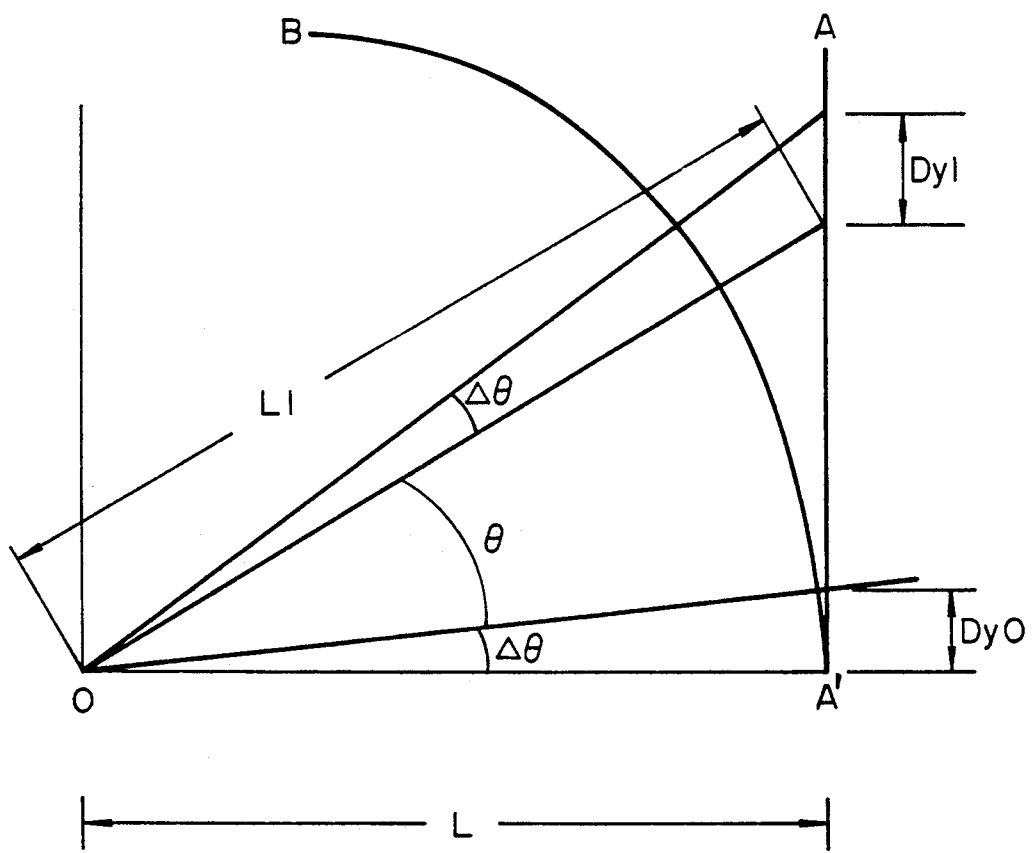

OPTICAL SCANNING APPARATUS AND SYSTEM

BACKGROUND OF THE INVENTION

The present invention relates to an optical scanning apparatus and system for scanning a surface to be scanned optically, and more particularly, to an electronic photographic printer, a scanner for scanning a surface of a document to read it as an image, and a photographic exposure apparatus for scanning a photosensitive surface to expose it.

In the optically scanning technique, the scanning is made by changing the direction of light. For example, in an electronic photographic apparatus, laser light (optical beam) concentrated into a beam is irradiated on a surface of a rotating mirror to vary the direction of the optical beam for scanning. There occurs a disadvantage that a scanning speed of the optical beam and a shape of a light spot formed by incidence of the optical beam on a surface of an object to be scanned, for example, a photosensitive body are varied. More particularly, there occurs a phenomenon (distortion aberration) that intervals (pitch) of the spots formed on the surface of the photosensitive body in the scanning direction are varied at a middle portion and a peripheral portion thereof and a phenomenon (curvature of field) that a position on which the optical beam is focused is shifted at the peripheral portion on the photosensitive body even if the optical beam is focused at the middle portion on the sensitive body.

FIG. 18 illustrates a principle of occurrence of the distortion aberration and the curvature of field. When a reflection position of the optical beam on a rotating mirror is O and a position on an object to be scanned is A-A', a relation of a width $Dy_0$ on A-A' upon scanning by the optical beam by $\Delta\theta$ in the direction of the point O from A', that is, in the direction of $\theta=0$ and a width $Dy_1$ on A-A' in the direction of $\theta=\theta$ is geometrically calculated by the following equation:

$$Dy_1 = Dy_0/\cos\theta \qquad (1)$$

Thus, $Dy_1$ is larger than $Dy_0$. In other words, the equation (1) means that the width on the object to be scanned is varied at irregular intervals when the scanning angle is varied at regular intervals. This is the distortion aberration.

When light reflected from the point O is focused on the object on A-A' in the direction of $\theta=0$, the position of the focal point of the light is moved along a circular arc of A'-B when the angle $\theta$ is changed and according the light is not focused on the surface A-A'. Such deviation of the focal point from the surface A-A' is named the curvature of field.

In the prior art, in order to correct the above distortion, at least two lenses, so-called $f\theta$ lenses, disposed between the rotating mirror and the photosensitive body are used.

Further, in order to reduce the distortion, if the scanning angle of the rotating mirror is made small, a necessary scanning width can not be ensured and hence it is necessary to increase a distance between the rotating mirror and the object to be scanned. In any case, there is a problem that an optical scanning apparatus itself is made large in size. In order to solve this problem, there is a technique that light is reflected plural times to lengthen an effective length of a light path as compared with an apparent length thereof. As this technique, there are known a technique of using a plurality of mirrors for reflecting light in the air plural times and a technique of using an optical block for the same purpose. A representative prior art relating to the former is described in Japanese Patent Unexamined Publication No. 59-198417 corresponding to U.S. Pat. No. 4,966,446. Representative prior art relating to the latter is described in Japanese Patent Unexamined Publication Nos. 2-301715 and 63-71824 and U.S. Pat. Nos. 4,867,547, 4,730,882 and 4,239,337.

On the other hand, there is a case where even a scanner having an opposite path to the optical path extending from the scanning mirror to the object to be scanned as described above, for example, a reading scanner having a reduced optical system utilizes an $f\theta$ lens disposed between an object to be read and a reading sensor for the same purpose and uses a plurality of mirrors to reflect light plural times, so that the apparatus is made small in size.

The above prior art has the following problems.

(1) When the expensive $f\theta$ lens is merely adopted only for correction of the optical distortion, costs of not only an optical scanning system and a device using this optical scanning system but also an optical scanning apparatus having the device mounted thereon are influenced and a low cost optical scanning apparatus can not be realized any more.

(2) In order to make small the optical system, even if the mirror or the optical block for reflecting light plural times is adopted, the expensive $f\theta$ lens is indispensable for reduction of the distortion.

SUMMARY OF THE INVENTION

It is an object of the present invention to solve the above drawbacks and to provide an inexpensive and small optical scanning apparatus capable of being substituted for the function of an $f\theta$ lens substantially without use of the $f\theta$ lens.

In order to achieve the above object, an optical block for reflecting light plural times therein is used instead of an expensive $f\theta$ lens and a ratio (ratio of optical path length) of the whole length of an optical path extending from an optical scanning portion such as a rotating mirror to an object to be scanned and the length of an optical path within the optical block is set to a predetermined value.

Further, part of the optical block is structured as a concave mirror against jitter in a sub-scanning direction on a photosensitive body occurring due to mechanical factors such as an accuracy of a surface of the rotating mirror and deflection or yaw of a rotating axis and a cylindrical lens is provided between the photosensitive body and the optical block.

In addition, in order to improve the positioning accuracy of the scanning, a single optical lens is used together with the optical block, and a radius of curvature of the lens surface as well as the optical path length and the ratio of optical path length of the optical block are set to predetermined values, respectively.

Since a moving distance on the scanning surface of light going out from the optical block is increased by a plurality of reflections of light within the optical block even if the scanning angle of light incident on the optical block is small and a substantial length of the optical path can be increased, the scanning angle can be made small. Consequently, it serves to reduce the distortion aberration and the curvature of field. At this time, when the ratio of optical path length is selected to be a predetermined value corresponding to a refractive index of the optical block, the refractive index of the optical block is operated to correct the curvature of field.

Further, when the single lens is used together with the optical block and the radius of curvature of the lens is selected to a predetermined value with respect to the ratio of optical path length, the refractive index of the optical block is operated to correct the curvature of field.

BRIEF DESCRIPTION OF THE DRAWINGS

FIG. 5 is a side view showing a second embodiment of the present invention;

FIG. 6 is a side view showing a third embodiment of the present invention;

FIG. 15 is a plan view showing the eighth embodiment of the present invention;

FIG. 16 is a side view showing a ninth embodiment of the present invention;

FIG. 17 is a side view showing a tenth embodiment of the present invention; and

FIG. 18 illustrates the distortion aberration and the curvature of field in the embodiment of the present invention.

DETAILED DESCRIPTION OF THE PREFERRED EMBODIMENTS

A first embodiment of the present invention is now described with reference to FIGS. 1 and 2.

Figure 1:
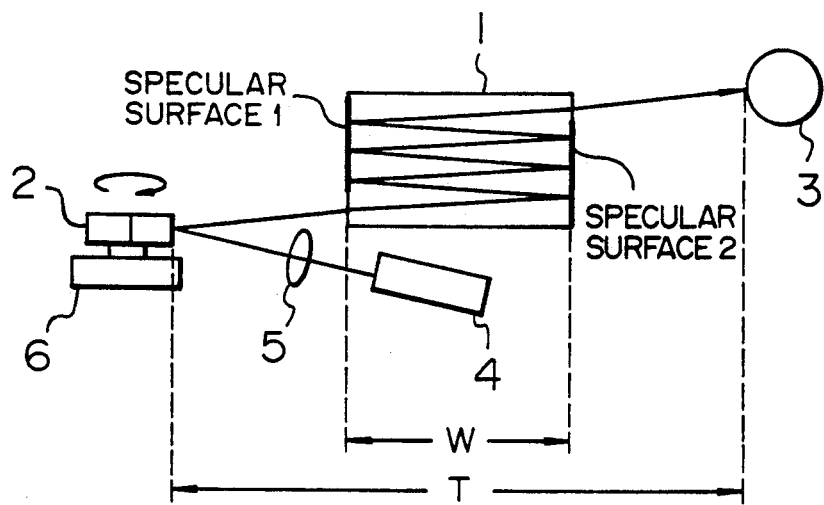
FIG. 1 is a side view of an optical scanning apparatus showing a first embodiment of the present invention.
Figure 2:
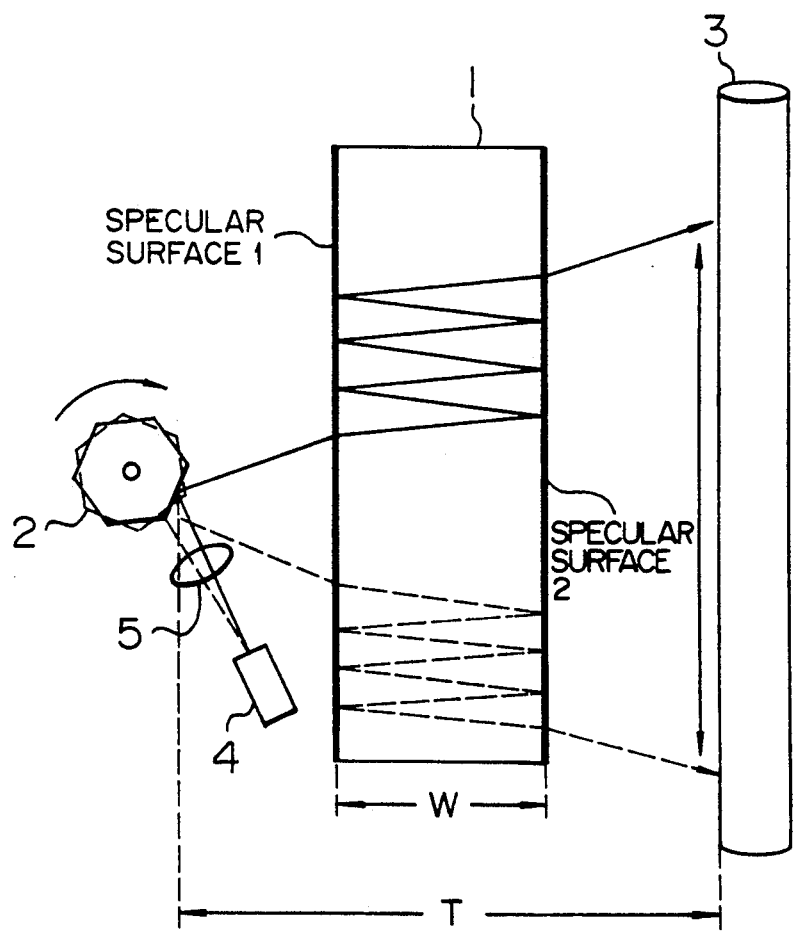
FIG. 2 is a plan view of the optical scanning apparatus showing the first embodiment of the present invention.

FIG. 1 is a side view of an optical scanning apparatus as viewed from the side thereof and FIG. 2 is a plan view of the apparatus as viewed from the top thereof. An optical block 1 is disposed between a rotating mirror 2 constituting scanning means and a photosensitive body 3 and includes specular surfaces 1 and 2 disposed near the rotating mirror 2 and the photosensitive body 3, respectively. The specular surfaces constitute part of principal surfaces of the optical block 1 and are a pair of specular surfaces for reflecting light toward the inside thereof and which are structured so that plane surfaces parallel to each other are opposed. An optical beam emitted from means 4 for generating laser beam passes through a lens 5 and impinges on the rotating mirror 2, which reflects the optical beam. The reflected optical beam is incident on the optical block 1 through a notch of the specular surface of the optical block 1. The incident optical beam is reflected by the specular surface 2 on the side of the photosensitive body 3 and the specular surface 1 on the side of the rotating mirror 2 of the optical block 1 alternately in succession and finally goes out from the optical block 1 through a notch of the specular surface on the side of the photosensitive body 3 to impinge on the photosensitive body 3.

As shown in the plan view of FIG. 2, since the rotating mirror 2 is rotated by a mirror motor 6, the photosensitive body 3 is scanned by the laser beam and is exposed. In this way, since the laser beam is reflected plural times within the optical block, an actual length of an optical path (effective length of optical path) from the rotating mirror 2 to the photosensitive body 3 is larger than a distance T from the rotating mirror to the photosensitive body 3 as shown in FIGS. 1 and 2. It has been found from a result of a simulation in which the distance T, a length W between the specular surfaces 1 and 2 (substantially equal to a length of a side of the optical block) and the number of times m of the reflection are varied that the curvature of field can be corrected when a ratio $\alpha$ (ratio of optical path length) of the whole length of the optical path from the rotating mirror to the photosensitive body and the length of the optical path including the reflection within the optical block is set to a predetermined value.

The simulation for correcting the curvature of field is now described.

① When optical beams emitted from two points on the optical lens 5 in a plane containing the optical beam shown in FIG. 2 is scanned in the central direction of the main scanning (in the perpendicular direction to the rotating axis of the photosensitive body), the focal distance of the optical lens 5 is determined so that the two optical beams are joined or combined (focused) on the photosensitive body.

② The scanning angle of the rotating mirror 2 is then changed to track the two optical beams so that a position on the photosensitive body where both of the optical beams are joined is obtained.

③ The distance T, the length W, the refractive index n of the optical block member and the number of times of reflection are changed and when scanning is made in the main scanning direction to at least a predetermined width of paper (for example, A3 size) on the photosensitive body 3, deviation of the focal point from the surface of the photosensitive body is calculated repeatedly in the trial and error manner.

④ A combination of deviation of the focal point from the surface of the photosensitive body which is smaller than the last calculated value is set as an initial value to implement the above calculation ③ and this calculation is repeatedly made until the deviation of the focal point is smaller than a predetermined allowable value.

Figure 3:
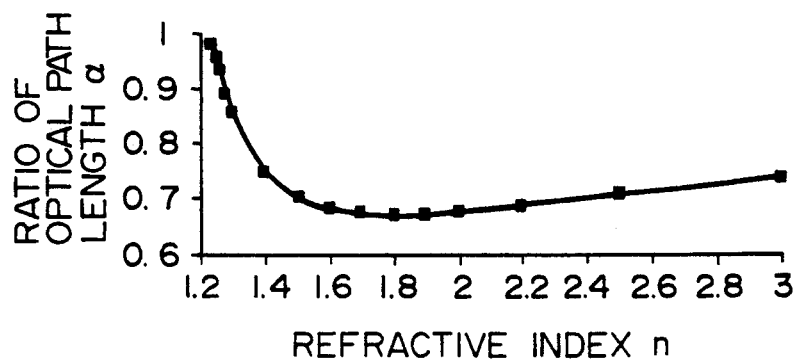
FIG. 3 is a graph showing a characteristic of the ratio of optical path length for correcting the curvature of field versus the refractive index of an optical block member in the first embodiment of the present invention.

FIG. 3 shows a ratio $\alpha$ of optical path length having the corrected curvature of field versus the refractive index n of the optical block, obtained by a simulation. $\alpha$ is the ratio of optical path length at the optical path in the central direction in case where the whole width of the surface to be scanned is scanned. The refractive index of the optical block manufactured of material which is currently available is 1.2 to 1.7 and FIG. 3 shows the ratio of optical path length versus the refractive index having 1.2 to 3. As apparent from FIG. 3, a value of $\alpha$ capable of correcting the curvature of field is varied in dependence on the refractive index, while it is understood that $\alpha$ may be selected to be at least 0.6 or more in order to correct the curvature of field. When the whole length of optical path of light traveling from the rotating mirror to the photosensitive body is L and a distance from the rotating mirror to the photosensitive body is A, a value $\alpha$ is expressed by:

$$\alpha = A/L \tag{2}$$

where W is a length of the optical block in the direction of the optical path, and m is the number of times of reflection of light within the optical block.

In the case of FIG. 1, when the distance T from the rotating mirror to the body to be scanned, the length W of the optical block in the direction of the optical path and the number of times m of reflection of light within the optical block are used, the equation is expressed as follows:

$$A = W \cdot (m+1) \tag{3}$$

$$L = T + W \cdot m \tag{4}$$

$$\alpha = W \cdot (m+1)/(T + W \cdot m) \tag{5}$$

That is, by selecting W, T and m properly, the dimension ratio $\alpha$ capable of correcting the curvature of field can be obtained.

In the embodiment, a pair of specular surfaces are constituted by parallel planes, while the pair of specular surfaces are not limited to the parallel planes and one or both of them may be curved. In brief, as far as it is structured so that light is reflected plural times and light comes into the optical block from one side thereof and goes out from the optical block through the other side thereof, the essence of the present invention is not varied.

Figure 4:
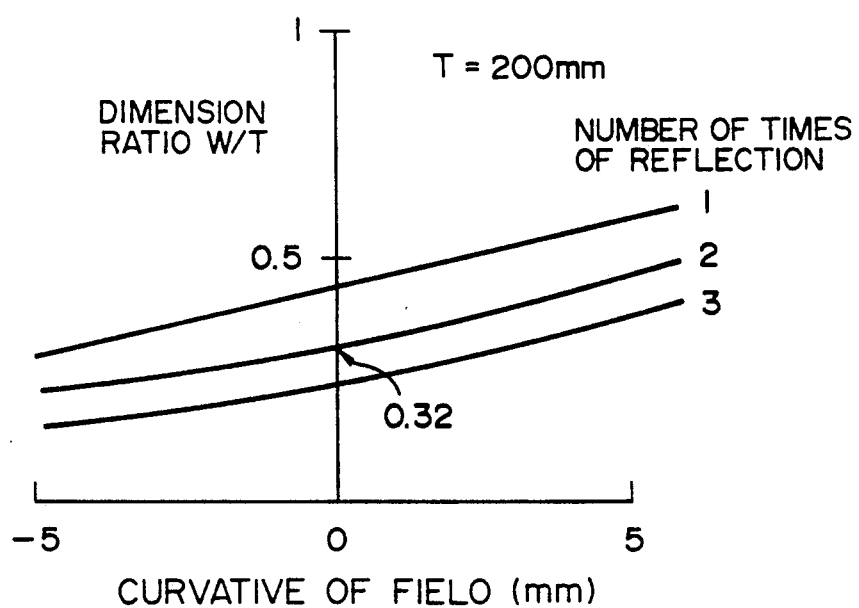
FIG. 4 is a characteristic diagram showing correction effects of the curvature of field with a dimension ratio in the first embodiment of the present invention.

FIG. 4 shows variation of the curvature of field when the number of times of reflection within the optical block 2 is varied in the case where the distance T between the rotating mirror and the photosensitive body is 200 mm. It is understood that there is the dimension ratio W/T capable of reducing the curvature of field to zero. When the number of times of reflection is two, the dimension ratio W/T is 0.32 and a calculated value of the whole length of the optical path at this time is 328 mm. That is, the distance T which does not include the reflection can be reduced to about 60% (=200 mm) of the whole effective length of the optical path by using the optical block and at the same time the curvature of field can be removed. Similarly, when the number of times of reflection is three, the whole length of the optical path is 392 mm and a reduction ratio of the optical path is about 51%. It is understood that by increasing the number of times of reflection in this way a small optical scanning apparatus without the curvature of field can be obtained. Material of the optical block may be any material as far as a predetermined refractive index is obtained. For example, plastic is light, cheap and practical and generally has the water absorption property and the dimension and the refractive index which tend to vary as compared with glass, while there is an effect that influence due to variation of the dimension and the refractive index is small if plastic is used to structure as in the present invention.

FIG. 5 illustrates a second embodiment (modification) of the present invention, in which an exit of light emerging from the optical block and the photosensitive body 3 are disposed on the side of the rotating mirror 2, so that the optical scanning apparatus is structured small. In this case, by selecting the above-mentioned $\alpha$ as shown in FIG. 3, there can be obtained the effect of correcting the curvature of field.

In the embodiments shown in FIGS. 1 and 2, light travels within the optical block in the direction of connecting the rotating mirror and the photosensitive body, while light may be reflected within the optical block in any direction in dependence on a structure of the specular surface of the optical block and if $\alpha$ is selected on the basis of the whole length of the optical path through which light passes, the curvature of field is corrected effectively.

FIG. 6 shows a third embodiment of the present invention. In FIG. 6, the rotating mirror 2 inclines in the direction perpendicular to the rotating axis thereof due to a manufacturing accuracy of mirror surfaces of the rotating mirror and deflection or yaw of the rotating axis, that is, has a so-called inclination of surface. This inclination of surface causes a positional deviation of the optical beam in the sub-scanning direction on the photosensitive body. In order to prevent influence of the inclination of surface, as shown in FIG. 6, the specular surface 2 of the optical block near the photosensitive body is curved (power) in the sub-scanning direction so that the outer surface of the optical block is convex toward the outside. Within the optical block, the inner surface of the specular surface 2 serves as a concave mirror and accordingly functions in the same manner that a convex lens is placed within the optical block. At this time, by selecting the curvature of the specular surface 2 so that light focused in the sub-scanning direction at the position of the rotating mirror is re-focused on the photosensitive body, that is, by selecting the curvature of the optical block so that the position of the focal point is conjugate, the inclination of surface can be corrected. In this case, there is a merit that the curvature of field and the inclination of surface can be corrected only by the optical block and the optical system can be simplified.

Figure 7:
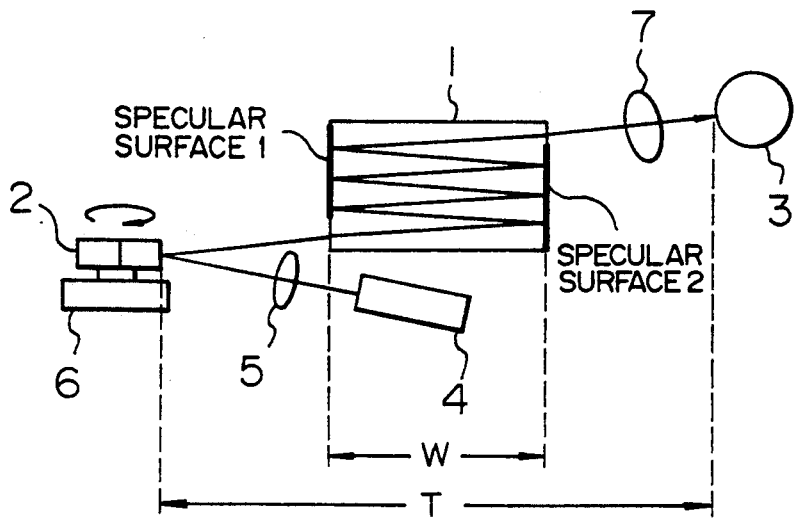
FIG. 7 is a side view showing a fourth embodiment of the present invention.
Figure 8:
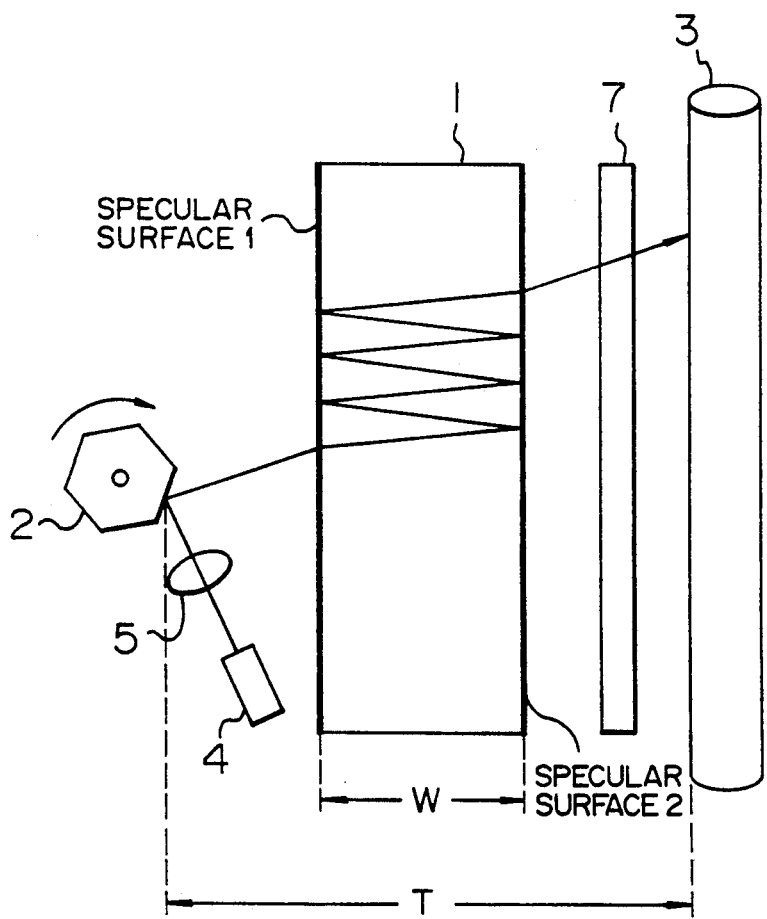
FIG. 8 is a plan view of the fourth embodiment of the present invention.

FIGS. 7 and 8 show a fourth embodiment of the present invention with FIG. 7 being a side view of the optical scanning apparatus and FIG. 8 being a plan view. In the embodiment, a cylindrical lens having power is disposed in the sub-scanning direction between the photosensitive body and the optical block instead of the provision of the curvature on the optical block. By selecting the focal distance of the cylindrical lens 7 so that the rotating mirror and the photosensitive body are conjugate to each other, there is an effect that the inclination of surface is corrected. The specular surfaces of the optical block 1 are formed into parallel planes which are easy to make, so that the curvature of field and the inclination of field can be corrected.

Figure 9:
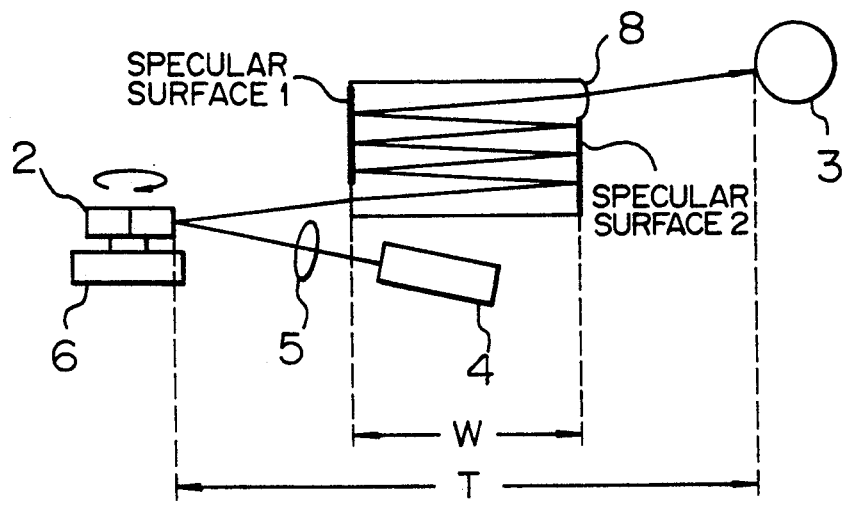
FIG. 9 is a side view showing a fifth embodiment of the present invention.

FIG. 9 shows a fifth embodiment of the present invention, in which a convex portion 8 is formed at the exit of light of the optical block in the sub-scanning direction and has an effect of correcting the inclination of surface in the same manner as FIG. 6.

Figure 10:
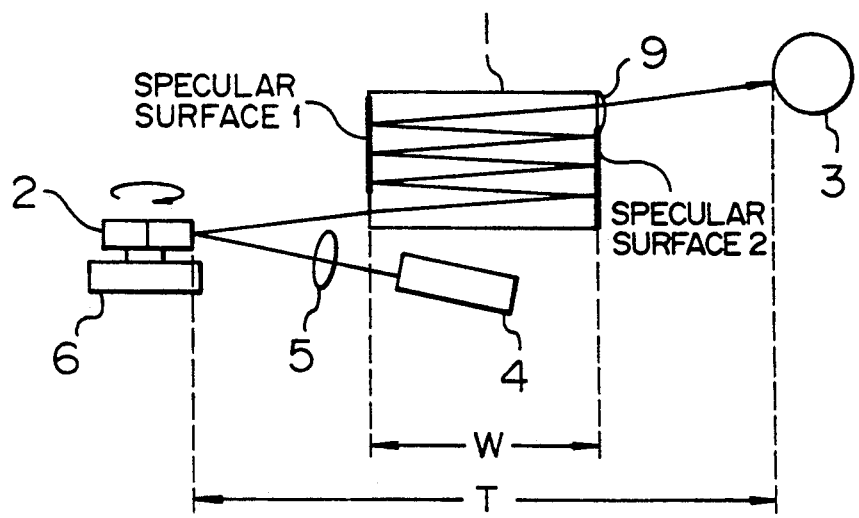
FIG. 10 is a side view showing a sixth embodiment of the present invention.

FIG. 10 shows a sixth embodiment of the present invention, in which a cylindrical lens having one surface which is formed into a plane and the other surface which is formed into a convex surface is mounted instead of the convex portion 8 of FIG. 8 and has an effect of correcting the inclination of surface in the same manner as FIG. 9.

Figure 11:
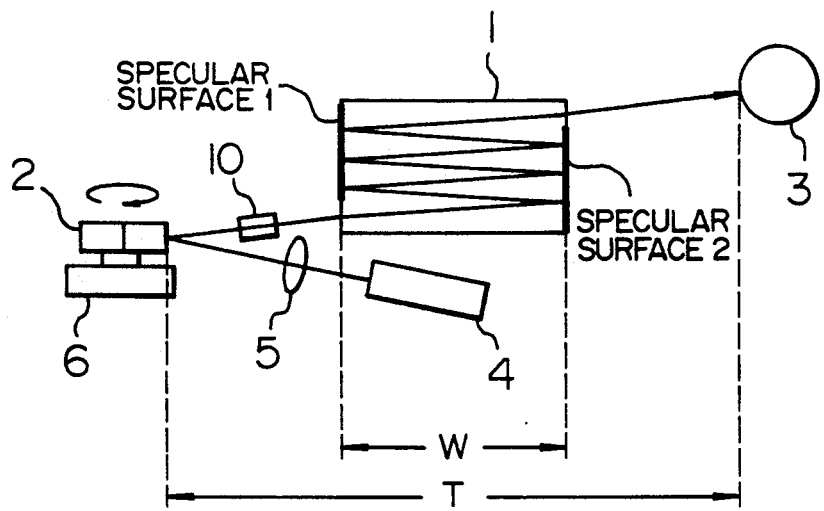
FIG. 11 is a side view showing a seventh embodiment of the present invention.
Figure 12:
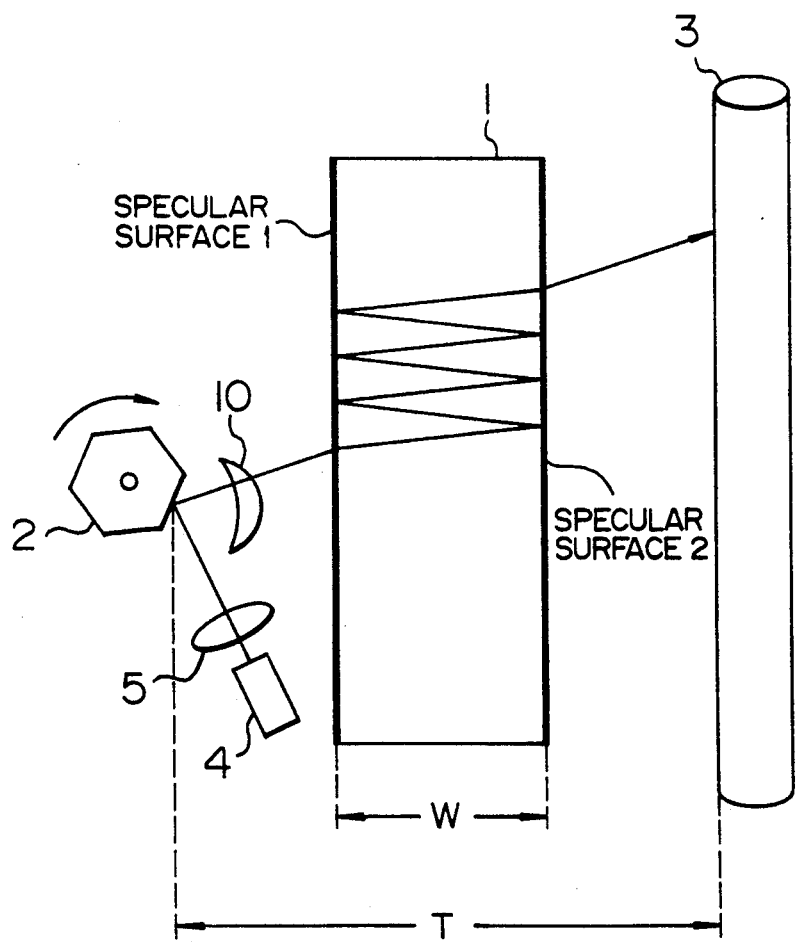
FIG. 12 is a plan view showing the seventh embodiment of the present invention.
Figure 13:
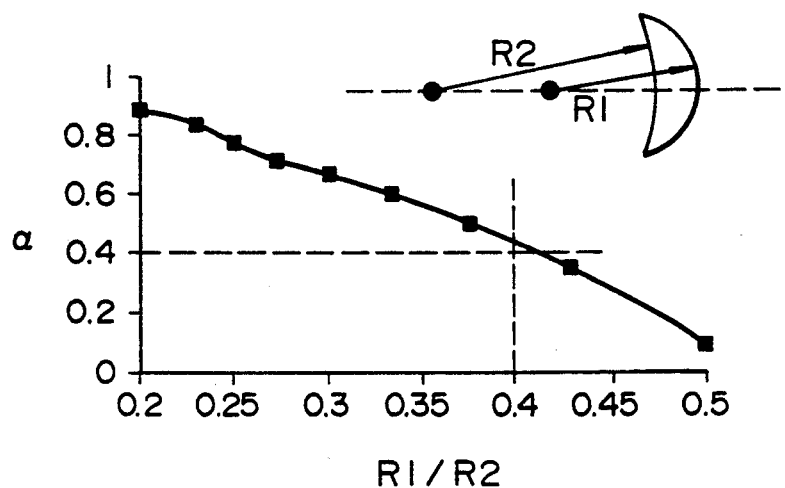
FIG. 13 is a characteristic diagram showing a relation of the optical length of the optical block capable of correcting the curvature of field and the ratio of curvature of the optical lens in the seventh embodiment of the present invention.

In the embodiments described above, any refractive member having power such as a lens is not disposed in the main scanning direction between the rotating mirror and the photosensitive body and light is focused on the photosensitive body by means of the optical lens disposed between the laser generating means 4 and the rotating mirror 2. Accordingly, it is necessary to lengthen the focal distance of the optical lens and hence it is an obstacle to miniaturization. In order to solve this problem, it is considered that one optical lens is disposed between the rotating mirror and the optical block. FIGS. 11 and 12 show a seventh embodiment of the present invention which attains the above idea and are a side view and a plan view of the optical scanning apparatus, respectively. An optical lens 10 is disposed between the rotating mirror 2 and the photosensitive body 3. In such a structure, it has been found from a result of a simulation for investigating a relation among the distance T, the length W and the curvature of surface of the optical lens 10 that there is a combination of values thereof capable of correcting the curvature of field. FIG. 13 is a graph showing a relation of a ratio of the radius of curvature (abscissa) of the optical lens 10 having the corrected curvature of field and the ratio $\alpha$ of optical path length (ordinate). As shown in FIG. 13, when the ratio $\alpha$ is selected to be 0.4 or more in consideration of the reduction ratio of the practical length of the optical path, there is shown that the curvature of field can be corrected within the range that R1/R2 is equal to or smaller than 0.4 where R1 and R2 are the radii of both surfaces of the optical lens 10, respectively. There is correction effect even if $\alpha$ is equal to or smaller than 0.4, while the optical system is large in size and a merit of using the optical block is reduced.

Figure 14:
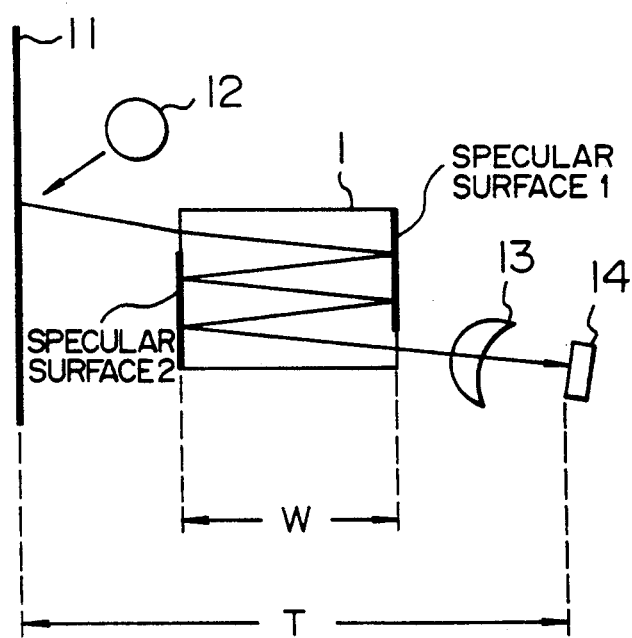
FIG. 14 is a side view showing an eighth embodiment of the present invention.

FIGS. 14 and 15 show an eighth embodiment in which the present invention is applied to a reading and scanning system and are a side view and a plan view thereof, respectively. The configuration of the scanning system is similar to the case of FIG. 11, while the traveling direction of light is opposite. (Light from the surface 11 to be scanned is incident on the optical block.) The surface to be scanned is an object 11 to be read such as a document. The object 11 to be read is illuminated by an illuminating light source 12 and light reflected by the object comes into the optical block 1 in which the light is reflected back and forth plural times. The reflected light within the optical block then passes through an optical lens 13 and reaches a reading sensor 14. A relation of the ratio $\alpha$ of the whole length of the optical path from the object 11 to be read to the reading sensor 14 and the length of the optical path including the reflection within the optical block is as shown in FIG. 13 described before and selection of $\alpha$ and R1/R2 can correct the curvature of field. Even in this case, the optical lens 13 has a convex surface facing to the optical block and a concave surface facing to the reading sensor. In this way, utilization of one optical block and one optical lens can attain the reading and scanning apparatus which is small in size and has no curvature of field.

FIG. 16 shows a ninth embodiment of the present invention. The embodiment is applied to an exposure scanning for a photosensitive body using a laser beam in a printer of an electrophotographic system. Light reflected by the rotating mirror 15 comes into the optical block 16 in which the light is reflected back and forth plural times. Then the light passes through a mirror 17 and reaches a photosensitive body 18. A latent image formed on the photosensitive body is developed by a developing device 19, the image being transferred onto a recording paper by a transferring corotron 20 and fixed by a fixing device 21. The recording paper is contained in a cassette 22. The whole control is made by a controller 23. With such a configuration, the printer itself can be made small and an inexpensive printer can be attained. Further, the printer using the optical block is not influenced by dust and dirt containing toner, vibration from the outside in a place in which the apparatus is installed, vibration of a moving portion in the printer and variation of surroundings such as temperature, humidity, atmospheric pressure and the like.

FIG. 17 shows a tenth embodiment of the present invention. The embodiment is applied to a reading portion and a recording portion of a facsimile. A document to be read 24 is illuminated by an illuminating light source and the reflected light is further reflected by a mirror 26, the light coming into an optical block 27 and being reflected in the optical block 27 back and forth plural times. Then, the light reaches a reading sensor 28. An image signal read by the reading sensor is encoded to compress a redundancy thereof and is modulated by a modem so that the modulated signal is transmitted to a communication line. The image signal transmitted through the communication line is demodulated by the modem and is returned to an encoded image signal, the image signal being decoded to the original image signal to extend the redundancy, the signal being recorded in the recording portion. The recording portion is configured in the same manner as in FIG. 16. In this way, by using the optical system including the optical block in the reading portion and the recording portion, a small and inexpensive facsimile can be provided. Further, similarly to the case of FIG. 16, there can be attained the facsimile which is not influenced by dust, vibration and surroundings.

The present invention is not limited to the above embodiments, while it can be applied to a reading scanner and an optical system for a drawing apparatus for photomask and an exposure apparatus for photoresist used in a manufacturing process of LSI. Further, it is needless to say that the present invention can be applied to an information input/output system including a printer, a facsimile and the like provided with the above optical scanning apparatus, for example, a desk top publishing system, a printing system, a presentation system and the like.

In manufacturing the optical block, material may be poured into a mold or a curved portion and a plane portion may be manufactured separately to be joined or affixed to each other.

Since the optical block provided with the specular surfaces formed in part of the inside thereof is used to lengthen the length of the optical path, the distortion aberration can be reduced and the curvature of field and the inclination of surface can be corrected. Accordingly, the optical scanning apparatus which is small in size can be attained. Further, the expensive f$\theta$ lens is not required and hence the inexpensive optical scanning apparatus can be achieved.

What is claimed is:

1. An optical scanning apparatus including:
   scanning means for scanning an optical beam in a main scanning direction; and
   an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block;
   said optical block being disposed between said scanning means and an object to be scanned, the optical beam from said scanning means being reflected back and forth within said optical block, the reflected optical beam then reaching said object to be scanned; wherein
   when the whole effective length of optical path from said scanning means to said object to be scanned is L and the length of optical path within said optical block including reflection is A, $A/L > 0.6$ is satisfied.

2. An optical scanning apparatus including:
   scanning means for scanning an optical beam in a main scanning direction; and
   an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block;
   said optical block being disposed between said scanning means and an object to be scanned, the optical beam from said scanning means being reflected back and forth within said optical block, the reflected optical beam then reaching said object to be scanned; wherein
   when a distance from said scanning means to said object to be scanned is T and the length of one side of said optical block in a reflection direction is W, W/T is set to a predetermined value in accordance with the number of times of reflection within said optical block.

3. An optical scanning apparatus comprising:
   scanning means for scanning an optical beam in a main scanning direction; and
   an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block;
   said optical block being disposed between said scanning means and an object to be scanned, the optical beam from said scanning means being reflected back and forth within said optical block, the reflected optical beam then reaching said object to be scanned;
   wherein a main surface of said optical block does not include a curvature in the main scanning direction and includes a curvature in a sub-scanning direction and said scanning means and said surface to be scanned have an optically conjugate arrangement relation in the sub-scanning direction to each other by a focal distance of a lens constituting said main surface.

4. An optical scanning apparatus comprising:
   scanning means for scanning an optical beam in a main scanning direction; and
   an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block;
   said optical block being disposed between said scanning means and an object to be scanned, the optical beam from said scanning means being reflected back and forth within said optical block, the reflected optical beam then reaching said object to be scanned; and
   further comprising a cylindrical lens disposed between said optical block and said object to be scanned and having a curvature provided in sub-scanning direction.

5. An optical scanning apparatus comprising:
   scanning means for scanning an optical beam in a main scanning direction; and
   an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block;
   said optical block being disposed between said scanning means and an object to be scanned, the optical beam from said scanning means being reflected back and forth within said optical block, the reflected optical beam then reaching said object to be scanned;
   wherein said optical block includes a curved surface formed on the side of said object to be scanned and having a curvature provided in a sub-scanning direction and a plane surface formed on the side of said scanning means.

6. An optical scanning apparatus comprising:
   scanning means for scanning an optical beam in a main scanning direction; and
   an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block;
   said optical block being disposed between said scanning means and an object to be scanned, the optical beam from said scanning means being reflected back and forth within said optical block, the reflected optical beam then reaching said object to be scanned;
   wherein said optical block includes a curved surface formed adjacent to a parallel plane thereof.

7. An optical scanning apparatus comprising:
   scanning means for scanning an optical beam in a main scanning direction; and
   an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block;

said optical block being disposed between said scanning means and an object to be scanned, the optical beam from said scanning means being reflected back and forth within said optical block, the reflected optical beam then reaching said object to be scanned; and further comprising a lens affixed on part of a parallel plane of said optical block and having one surface formed into a plane surface.

8. An optical scanning apparatus comprising:

scanning means for scanning an optical beam in a main scanning direction; and an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block;

said optical block being disposed between said scanning means and an object to be scanned, the optical beam from said scanning means being reflected back and forth within said optical block, the reflected optical beam then reaching said object to be scanned;

wherein an exit of light going out from said optical block and said object to be scanned are disposed on the side of said scanning means.

9. An electrophotographic printer comprising:

scanning means for scanning an optical beam in a main scanning direction; and an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block;

said optical block being disposed between said scanning means and an object to be scanned, the optical beam from said scanning means being reflected back and forth within said optical block, the reflected optical beam then reaching said object to be scanned and forming an electrostatic latent image thereon;

a developing device for developing said electrostatic latent image with toner as a toner image;

a transferring device for transferring said developed toner image onto a recording paper; and a fixing device for fixing said transferred toner image onto said recording paper.

10. An optical scanning apparatus including:

scanning means for scanning an optical beam in a main scanning direction; and an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block; said scanning means, an optical lens, said optical block and said object to be scanned are disposed in order of description, light from said scanning means passing through said optical lens, the light being reflected back and forth within said optical block, reaching said object to be scanned; wherein when the whole effective length of optical path from said scanning means to said object to be scanned is L and the length of optical path within said optical block including reflection is A, $A/L>0.4$ is satisfied.

11. An optical scanning apparatus comprising:

scanning means for scanning an optical beam in a main scanning direction; and an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block; said scanning means, an optical lens, said optical block and said object to be scanned are disposed in order of description, light from said scanning means passing through said optical lens, the light being reflected back and forth within said optical block, reaching said object to be scanned;

wherein a surface shape of said optical lens on the side of said optical block is convex in the main scanning direction and a surface shape of said optical lens on the side of said scanning means is concave.

12. An optical scanning apparatus according to claim 11, wherein when a radius of curvature of said convex surface is R1 and a radius of curvature of said concave surface is R2, $R1/R2<0.4$.

13. An optical scanning apparatus comprising:

scanning means for scanning an optical beam in a main scanning direction; and an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block; said scanning means, an optical lens, said optical block and said object to be scanned are disposed in order of description, light from said scanning means passing through said optical lens, the light being reflected back and forth within said optical block, reaching said object to be scanned;

wherein a main surface of said optical block does not include a curvature in the main scanning direction and includes a curvature in a sub-scanning direction and said scanning means and said surface to be scanned have an optically conjugate relation in the sub-scanning direction to each other by a focal distance of a lens constituting said main surface and a focal direction of said optical lens.

14. An optical scanning apparatus comprising:

scanning means for scanning an optical beam in a main scanning direction; and an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block; said scanning means, an optical lens, said optical block and said object to be scanned are disposed in order of description, light from said scanning means passing through said optical lens, the light being reflected back and forth within said optical block, reaching said object to be scanned; and further comprising a cylindrical lens disposed between said optical block and said object to be scanned and having a curvature provided in sub-scanning direction.

15. An optical scanning apparatus comprising:
scanning means for scanning an optical beam in a main scanning direction; and
an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block; said scanning means, an optical lens, said optical block and said object to be scanned are disposed in order of description, light from said scanning means passing through said optical lens, the light being reflected back and forth within said optical block, reaching said object to be scanned;
wherein said optical block includes a curvature provided in sub-scanning direction on a surface on the side of said object to be scanned and a plane surface formed on a surface on the side of said scanning means.

16. An optical scanning apparatus comprising:
scanning means for scanning an optical beam in a main scanning direction; and
an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block; said scanning means, an optical lens, said optical block and said object to be scanned are disposed in order of description, light from said scanning means passing through said optical lens, the light being reflected back and forth within said optical block, reaching said object to be scanned;
wherein opposite surfaces of said pair of specular surfaces are formed into parallel planes, and said optical block includes a curved surface formed adjacent to a parallel plane thereof.

17. An optical scanning apparatus comprising:
scanning means for scanning an optical beam in a main scanning direction; and
an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block; said scanning means, an optical lens, said optical block and said object to be scanned are disposed in order of description, light from said scanning means passing through said optical lens, the light being reflected back and forth within said optical block, reaching said object to be scanned;
wherein opposite surfaces of said pair of specular surfaces are formed into parallel planes, and further comprising a lens affixed on part of a parallel plane of said optical block and having one surface formed into a plane surface.

18. A facsimile apparatus comprising:
a reading portion including scanning means for scanning an optical beam in a main scanning direction; and an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block; said scanning means, an optical lens, said optical block and said object to be scanned are disposed in order of description, light from said scanning means passing through said optical lens, the light being reflected back and forth within said optical block, reaching said object to be scanned;
encoding means for encoding an image signal read by said reading portion; and
transmitting means for sending the image signal encoded by said encoding means to a communication line.

19. A facsimile apparatus according to claim 18, further comprising:
receiving means for receiving the encoded image signal from said communication line;
decoding means for decoding the image signal received by said receiving means; and
a recording portion including another optical scanning apparatus for recording the image signal decoded by said decoding means.

20. An optical scanning apparatus according to claim 19, wherein said another optical scanning apparatus comprises:
scanning means for scanning an optical beam in a main scanning direction; and
an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block;
said optical block being disposed between said scanning means and an object to be scanned, the optical beam from said scanning means being reflected back and forth within said optical block, the reflected optical beam then reaching said object to be scanned.

21. An optical scanning apparatus comprising:
a reading sensor;
an optical lens; and
an optical block including a plurality of plane surfaces or curved surfaces and a pair of specular surfaces formed at part of the surfaces for reflecting light toward the inside of said optical block;
said optical block, said optical lens and said reading sensor are disposed in order of description from an object to be read, light from said object to be read being reflected within said optical block back and forth plural times, the light then passing through said optical lens, reaching said reading sensor; wherein when the whole length of optical path from said object to be read to said reading sensor is L and the length of optical path within said optical block including reflection is A, $A/L > 0.4$ is satisfied.

22. An optical scanning apparatus according to claim 21, wherein a surface shape of said optical lens on the side of said optical block is convex in main scanning direction and a surface shape of said optical lens on the side of said reading sensor is concave in main scanning direction.

23. An optical scanning apparatus according to claim 21, wherein when a radius of curvature of said convex surface is R1 and a radius of curvature of said concave surface is R2, R1/R2<0.4.

24. An optical scanning apparatus according to claim 21, wherein opposite surfaces of said pair of specular surfaces are formed into parallel planes.

25. An optical scanning apparatus according to claim 24, further comprising a cylindrical lens disposed between said optical block and said object to be read and having a curvature provided in sub-scanning direction.

26. An optical scanning apparatus according to claim 24, wherein said optical block includes a curved surface formed adjacent to a parallel plane thereof.

27. An optical scanning apparatus according to claim 24, comprising a lens affixed on part of a parallel plane of said optical block and having one surface formed into a plane surface.

28. An optical scanning apparatus according to claim 24, further comprising a cylindrical mirror disposed between said optical block and said object to be read and having a curvature provided in sub-scanning direction.

29. An optical scanning apparatus according to claim 21, wherein a surface of said optical block does not include a curvature in main scanning direction and includes a curvature in sub-scanning direction and said object to be read and said reading sensor have an optically conjugate relation in the sub-scanning direction to each other by a focal distance of a lens constituting said main surface and a focal distance of said optical lens.

30. An optical scanning apparatus according to claim 21, wherein said optical block is made of plastic.

31. An optical scanning apparatus according to claim 21, wherein said optical block includes a curvature provided in sub-scanning direction on a surface on the side of said object to be read and a plane surface formed on a surface on the side of said reading sensor.

32. A reading scanner comprising said optical scanning apparatus according to claim 21.

33. An optical scanning apparatus comprising:
scanning means for scanning an optical beam in a main scanning direction; and
an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block;
said optical block being disposed between said scanning means and an object to be scanned, the optical beam from said scanning means being reflected back and forth within said optical block, the reflected optical beam then reaching said object to be scanned; and
further comprising a cylindrical mirror disposed between said optical block and said object to be scanned and having a curvature provided in sub-scanning direction.

34. An optical scanning apparatus comprising:
scanning means for scanning an optical beam in a main scanning direction; and
an optical block including a plurality of plane surfaces or curved surfaces and on which the optical beam scanned by said scanning means is incident, said optical block including a pair of specular surfaces formed in part of said surfaces for reflecting the incident optical beam toward the inside of said optical block; said scanning means, an optical lens, said optical block and said object to be scanned are disposed in order of description, light from said scanning means passing through said optical lens, the light being reflected back and forth within said optical block, reaching said object to be scanned; and
further comprising a cylindrical mirror disposed between said optical block and said object to be scanned and having a curvature provided in sub-scanning direction.

* * * * *